(No Model.)
F. H. LIPPINCOTT.
SODA WATER APPARATUS.
No. 375,452. Patented Dec. 27, 1887.
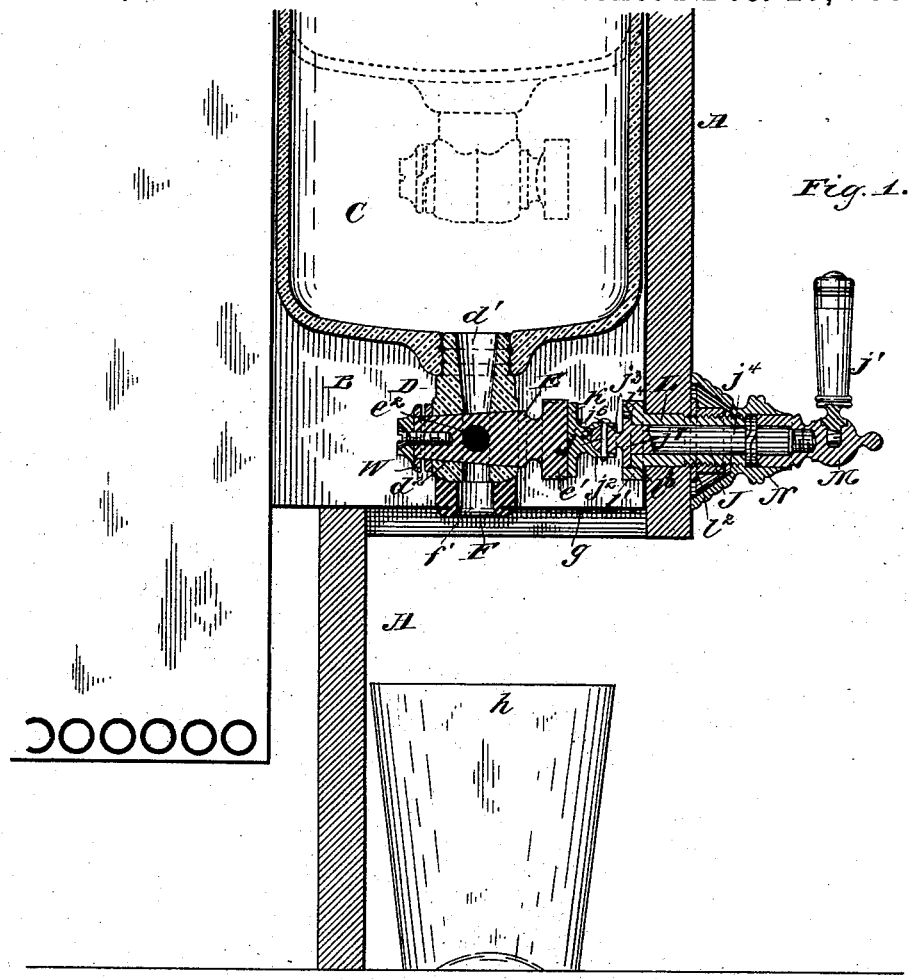
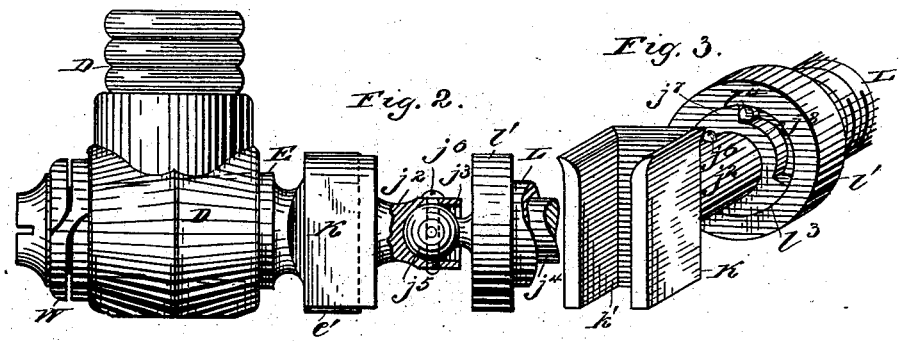
WITNESSES:
INVENTOR

United States Patent Office.

F. HAZARD LIPPINCOTT, OF PHILADELPHIA, PENNSYLVANIA, ASSIGNOR TO CHARLES LIPPINCOTT & CO., OF SAME PLACE.

SODA-WATER APPARATUS.

SPECIFICATION forming part of Letters Patent No. 375,452, dated December 27, 1887.

Application filed July 12, 1887. Serial No. 244,055. (No model.)

*To all whom it may concern:*

Be it known that I, F. HAZARD LIPPINCOTT, a citizen of the United States, residing at the city and county of Philadelphia, and State of Pennsylvania, have invented certain new and useful Improvements in Soda-Water Apparatus, of which the following is a full, clear, and exact description, reference being had to the accompanying drawings, of which—

Figure 1 is a longitudinal vertical sectional elevation of the lower portion of part of a soda-water apparatus provided with my improvements. Fig. 2 is a side elevation, on an enlarged scale, of the cock detached, showing the recessed head on the end of the handle-shaft connected to the cock-key. Fig. 3 is a perspective view of said head and adjuncts.

The nature of this invention is a soda-water apparatus wherein the sirup-jars are readily removable and replaceable without disturbance of the devices for turning the cocks of said jars.

The invention consists, primarily, in the combination, with a sirup-jar having a cock in the neck thereof, of a shaft projecting beyond the outer casing of the fountain and provided with a handle on its outer end for operating the key of said cock, the inner end of said shaft being constructed so that the jar, with the cock therein, may be readily removed from and replaced within the containing-chamber (or another similar jar substituted therefor) without necessitating the breaking or disturbance of any joints or connections, yet, when the jar is in place, the cock therein will be in engagement with said shaft and may be readily opened or closed by turning the handle on the end of the latter on the outside of the casing.

The invention consists, also, in certain details of construction, which will be hereinafter pointed out.

Referring to the annexed drawings, A is the casing of an ordinary soda-water fountain, usually of marble, and B is one of the chambers for receiving the inverted glass sirup-jar C. At the bottom of said jar I fasten, by means of a suitable cement, a glass neck or cock, D, provided with a vertical orifice, $d'$, and a tapering transverse opening, $d^2$, for the reception of the key E. The latter has a transverse head, $e'$, and the usual opening, $e^2$. In the drawings the key is shown turned so that the opening $d'$, or passage-way from the jar, is closed. The lower end of the neck, which carries the cock, rests upon a bed, F, of india-rubber or other soft or yielding substance, having also an opening, $f'$, coinciding with the opening $d'$, leading into the jar, and this bed is secured to or rests upon the bottom $g$ of the chamber in which the jar is contained, so that when the cock is opened the sirup in the jar will fall into a glass, $h$, beneath.

J is a shaft which extends outside the chamber and casing and has on its outer end a handle, $j'$. That part of the shaft within the chamber terminates in a head, K, having a slot or recess, $k'$, which preferably widens out at the top, as seen in Fig. 3, the construction and position being such, as clearly shown in Fig. 1, that the head of the key will freely enter the recess when the cock is turned off and the jar is let down until the end of the neck rests upon the bed F.

In order that the head of the cock-key may be caused to more readily enter the recess $k'$, I prefer to make the shaft J in two parts, the one $j^2$ having a socket, $j^3$, in its end, and the contiguous end of the other, $j^4$, having a ball, $j^5$, formed thereon, which fits within said socket and is pivoted horizontally therein by means of a pin, $j^6$. Thus if the key should strike the side of the recess $k'$ the part of the shaft carrying the recessed head will move laterally and allow the key-head to enter said recess.

The shaft J, which, as before stated, has a handle, $j'$, on its outer end, passes through a sleeve, L, secured in the side A of the fountain. This sleeve has a head, $l'$, on its inner end, which bears against the inside of case A, and its projecting end is screw-threaded and provided with a nut, $l^2$, which is screwed up tight against the outer side of the case. On the face of said head $l'$ is a circular recess, $l^3$, within which fits a corresponding flange, $j^7$, on the shaft J. This flange has a quadrantal recess, $j^8$, in its periphery, into which recess there projects from head $l'$ a stud, $l^4$. When the shaft J is turned, the stud $l^4$, striking against the ends of the recess, limits the throw of the key to the open and closed positions—*i. e.*, to a quarter-turn.

In order to prevent the shaft J and the recessed head K thereon from moving longitudinally when the jar is removed, and thus interfering with its free replacement, I usually interpose between the sleeve L and a head, M, to which shaft J and its handle $j'$ are secured, a small spring-washer, N, which retains the parts in position.

The key E of the cock D has previously been made of metal, which soon becomes corroded and foul from the action of the liquid thereon, thereby seriously affecting the latter. In order, therefore, to obviate this, I now make said key of vulcanite, which remains unaffected by the action of the liquid. Between the end of the cock and the head or nut of the retaining-screw on the end of the key I sometimes interpose a spring-washer, W, which holds the key securely in its seat and prevents its accidental turning.

Having thus described my invention, I claim as new and wish to secure by Letters Patent—

1. In a soda-water fountain, the combination, with a sirup-jar having a cock in the neck thereof, of a shaft projecting beyond the outer casing of the fountain and provided with a handle on its outer end, and the recessed head pivoted on the inner end of said shaft, substantially as and for the purpose set forth.

2. In a soda-water fountain, the combination, with a sirup-jar having a cock in the neck thereof, of a shaft projecting beyond the outer casing of the fountain and provided with a handle on its outer end, together with the recessed head pivoted on the inner end of said shaft and having the top of its sides flaring, substantially as and for the purpose set forth.

3. In a soda-water apparatus, the combination, with a sirup-jar having a cock in the neck thereof, of the shaft J, projecting through and beyond the outer casing of the fountain, the recessed head K on the inner end of said shaft, the handle $j'$ on the outer end thereof, the sleeve L, through which said shaft extends, provided with a head, $l'$, on its inner end, the nut $l^2$ on said sleeve, exterior to the casing, the recessed flange $j^1$ on said shaft, the stop $l^4$ on said sleeve, projecting into the recess in said flange, and the spring-washer N, interposed between the outer end of the sleeve L and a head, M, on said shaft J, all substantially as and for the purpose specified.

In testimony whereof I have hereunto affixed my signature this 30th day of June, A. D. 1887.

F. HAZARD LIPPINCOTT.

Witnesses:
   JNO. NOLAN,
   ANDREW ZANE, Jr.